US011994823B2

(12) United States Patent
Ito et al.

(10) Patent No.: US 11,994,823 B2
(45) Date of Patent: May 28, 2024

(54) IMAGE FORMING APPARATUS

(71) Applicant: CANON KABUSHIKI KAISHA, Tokyo (JP)

(72) Inventors: Shingo Ito, Tokyo (JP); Toshihiko Takayama, Kanagawa (JP); Shuichi Tetsuno, Kanagawa (JP); Hiroko Katagiri, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/149,350

(22) Filed: Jan. 3, 2023

(65) Prior Publication Data

US 2023/0221673 A1 Jul. 13, 2023

(30) Foreign Application Priority Data

Jan. 11, 2022 (JP) ................................ 2022-002364

(51) Int. Cl.
*G03G 21/00* (2006.01)
*G03G 21/16* (2006.01)

(52) U.S. Cl.
CPC ..... *G03G 21/0035* (2013.01); *G03G 21/0064* (2013.01); *G03G 21/1676* (2013.01);
(Continued)

(58) Field of Classification Search
CPC ........... G03G 21/0035; G03G 21/0064; G03G 21/1676; G03G 21/168; G03G 2221/0005; G03G 2221/0047
See application file for complete search history.

(56) References Cited

U.S. PATENT DOCUMENTS 5,146,285 A * 9/1992 Kikuchi ............. G03G 21/0035
399/150
5,200,789 A 4/1993 Oshiumi
(Continued)

FOREIGN PATENT DOCUMENTS

JP H05-94113 A 4/1993
JP 2005-115214 A 4/2005
(Continued)

OTHER PUBLICATIONS

Search Report dated Jun. 22, 2023, in European Patent Application No. 23150099.2.

*Primary Examiner* — Ryan D Walsh
(74) *Attorney, Agent, or Firm* — Venable LLP

(57) ABSTRACT

An image forming apparatus includes a rotatable image bearing member, a developing member to develop an electrostatic latent image at a developing portion, a transfer member to transfer a developer image to a recording member at a transfer portion; and a brush provided with a plurality of base materials contacting the image bearing member at downstream of the transfer portion and upstream of the developing portion in a rotational direction of the image bearing member. The developer remaining on the surface of the image bearing member is collected in the developing portion. An average distance between base materials of the brush with respect to a rotational axis direction of the image bearing member is larger than an average particle diameter of the developer, and is equal to or less than a length corresponding to a spatial frequency visually recognizable by a user when the image formed by the image forming apparatus is observed by the user.

14 Claims, 6 Drawing Sheets

(52) U.S. Cl.
CPC ... *G03G 21/168* (2013.01); *G03G 2221/0005* (2013.01); *G03G 2221/0047* (2013.01)

(56) References Cited

U.S. PATENT DOCUMENTS

| | | | | | |
|---|---|---|---|---|---|
| 5,652,649 | A * | 7/1997 | Ikegawa | G03G 15/0233 399/175 |
| 9,341,988 | B2 * | 5/2016 | Funatani | G03G 21/12 |
| 11,397,400 | B2 | 7/2022 | Funatani et al. | |
| 11,720,046 | B2 * | 8/2023 | Funatani | G03G 21/10 399/129 |
| 2006/0093955 | A1 * | 5/2006 | Ohshima | G03G 21/0035 430/119.71 |
| 2023/0221675 | A1 * | 7/2023 | Tetsuno | G03G 21/0035 399/353 |

FOREIGN PATENT DOCUMENTS

| | | | | |
|---|---|---|---|---|
| JP | 2006-023540 | A | | 1/2006 |
| JP | 2007248748 | A | * | 9/2007 |
| JP | 2008-116575 | A | | 5/2008 |
| JP | 2021-189358 | A | | 12/2021 |

* cited by examiner

IMAGE FORMING APPARATUS

FIELD OF THE INVENTION AND RELATED ART

The present invention relates to an image forming apparatus that forms images on a recording material.

In an electrophotographic image forming apparatus, a cleaner-less method (simultaneous developing and cleaning unit) is known in which toner (developer) remaining on the photosensitive drum without being transferred to the recording material from the photosensitive drum as an image bearing member is collected and reused in the developing portion in the developing device. In the cleaner-less method, it is required to reduce the possibility that foreign matter such as paper fibers and fillers (hereinafter collectively referred to as "paper dust") adhering to the photosensitive drum will have an undesirable effect on the subsequent image forming process. Japanese Laid-Open Patent Application No. 2021-189358 describes collecting paper dust on the photosensitive drum by means of a brush member contacting portion of the photosensitive drum surface to reduce the amount of paper dust that reaches the charging portion and developing portion downstream from the transfer portion.

In the case of using the brush member described in the above application, if the brush member accumulates a large amount of toner, the brush member may eject toner lumps at some point, such as when the contact state of the brush member changes or when the potential difference between the brush member and the photosensitive drum fluctuates greatly. The toner lumps ejected from the brush member are not fully collected by the developing device and are transferred to the recording material, which may cause image defects.

On the other hand, if the brush member does not accumulate toner, the paper dust collection performance may also be degraded. Paper dust that slips through the brush member may have undesirable effects on the subsequent image forming process, such as preventing uniform charging of the photosensitive drum surface in the charging process, and causing image defects (black spots).

SUMMARY OF THE INVENTION

Therefore, the present invention provides an image forming apparatus capable of reducing toner accumulation while ensuring the paper dust collection performance of the brush member.

One embodiment of the present invention is an image forming apparatus comprising: a rotatable image bearing member; a developing member configured to develop an electrostatic latent image formed on the image bearing member using a developer at a developing portion; a transfer member configured to transfer a developer image developed by the developing member from the image bearing member to a transferred member at a transfer portion; and a brush contacting the image bearing member at a position of downstream of the transfer portion and upstream of the developing portion with respect to a rotational direction of the image bearing member, and wherein the developer remaining on the surface of the image bearing member is collected in the developing portion, wherein an average distance between base materials of the brush with respect to a rotational axis direction of the image bearing member is larger than an average particle diameter of the developer, and is equal to or less than a length corresponding to a spatial frequency visually recognizable by a user when the image formed by the image forming apparatus is observed by the user.

Another embodiment of the present embodiment is an image forming apparatus comprising: a rotatable image bearing member; a developing member configured to develop an electrostatic latent image formed on the image bearing member using a developer at a developing portion; a transfer member configured to transfer a developer image developed by the developing member from the image bearing member to a transferred member at a transfer portion; and a brush contacting the image bearing member at a position of downstream of the transfer portion and upstream of the developing portion with respect to a rotational direction of the image bearing member, wherein the developer remaining on the surface of the image bearing member is collected in the developing portion, and wherein an average distance between base materials of the brush with respect to a rotational axis direction of the image bearing member is larger than an average particle diameter of the developer, and is equal to or less than 50 μm.

Further features of the present invention will become apparent from the following description of exemplary embodiments with reference to the attached drawings.

Figure 4:
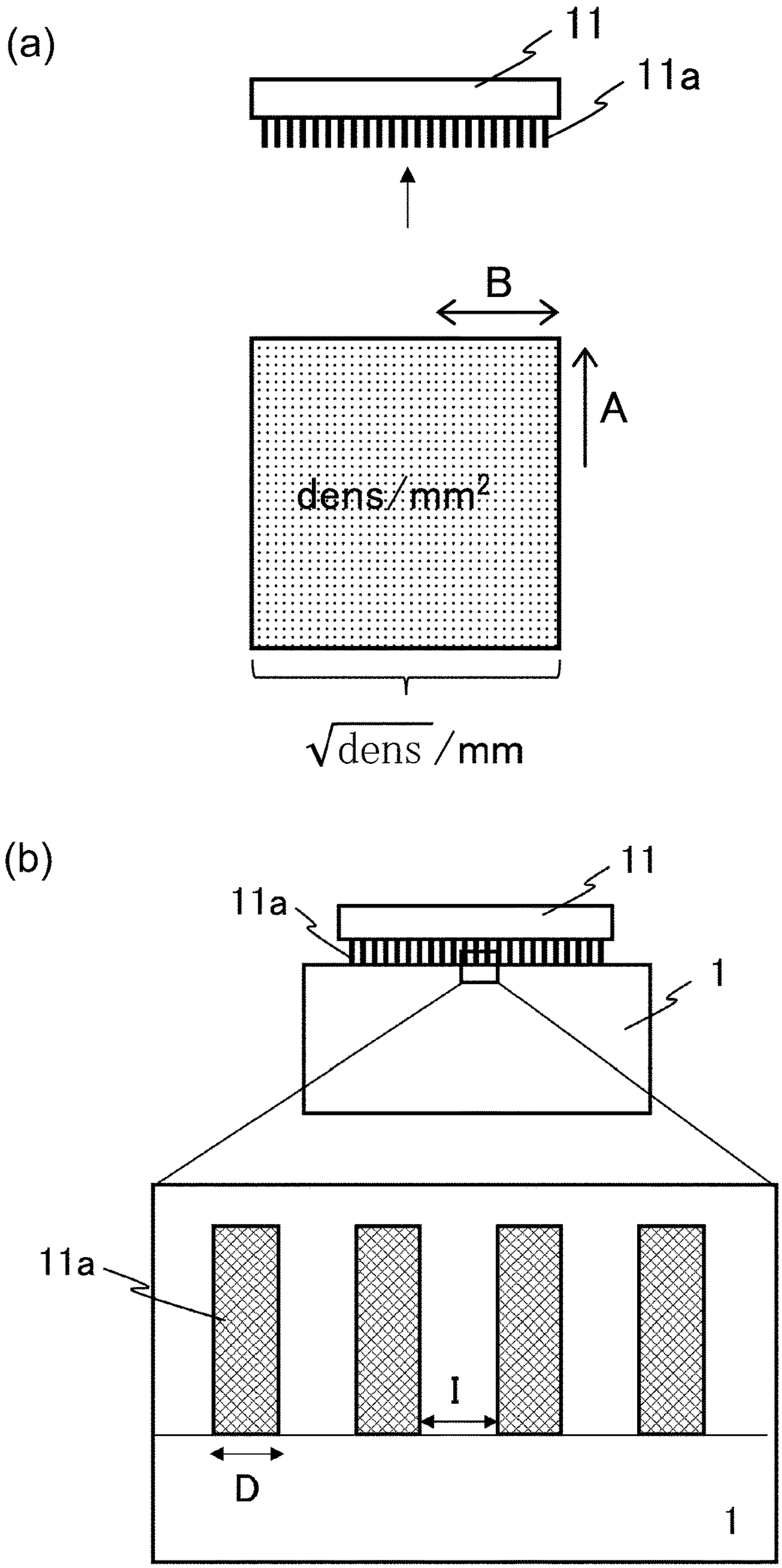

Part (a) of FIG. 4 is a schematic drawing of the brush member according to embodiment 1, viewed from the leading end of the bristle material. Part (b) of FIG. 4 is a schematic drawing of the brush member viewed from the upstream side in the rotation direction of the photosensitive drum.

Figure 5:
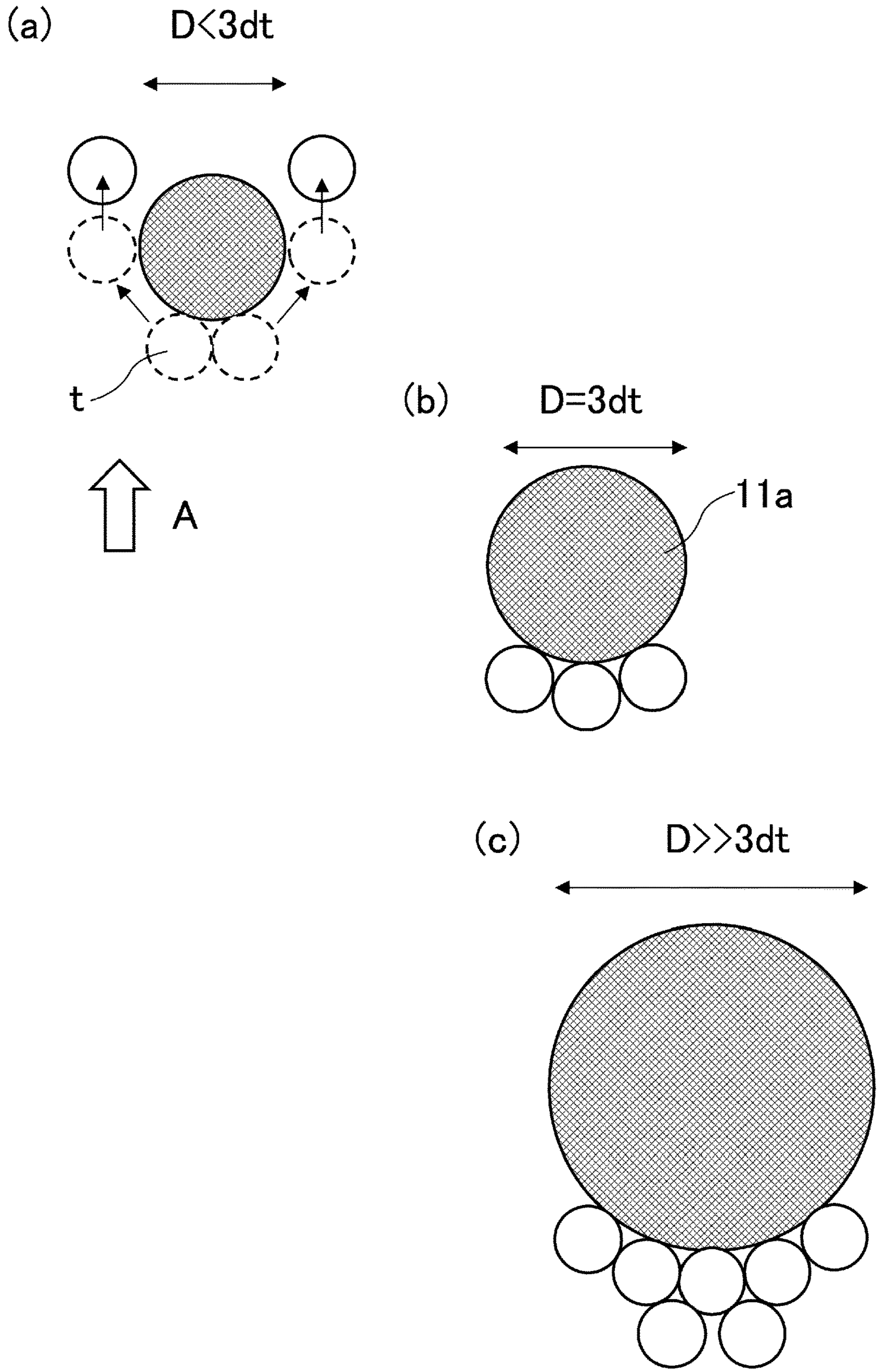

FIG. 5, parts (a) to (c), is schematic drawings showing the relationship between the fiber diameter of the bristle material of the brush member and the toner particle diameter.

Figure 6:
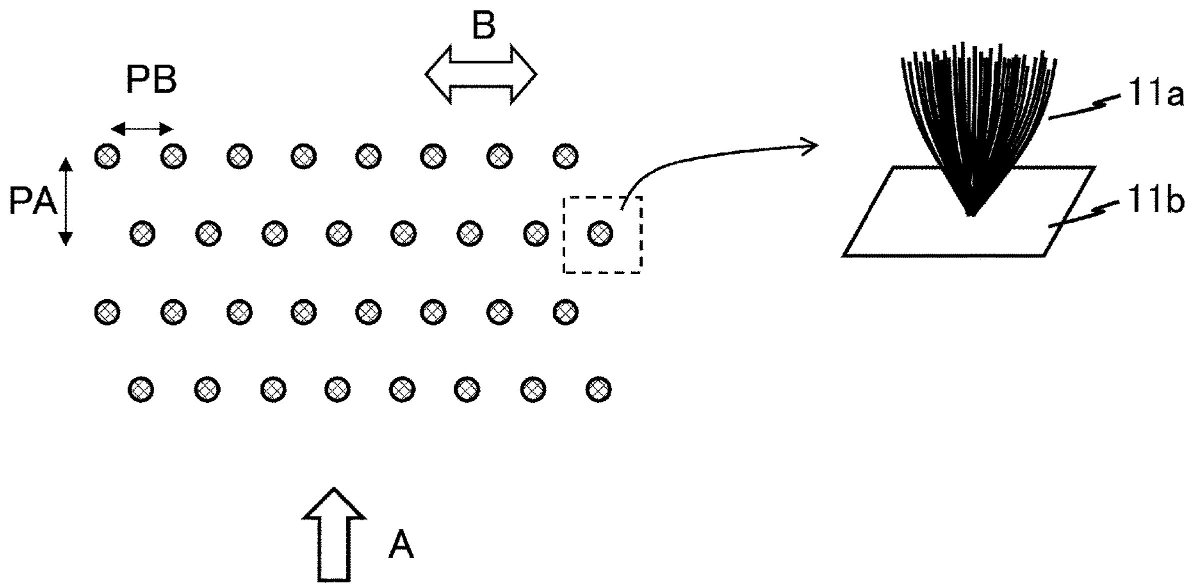

FIG. 6 is a drawing showing the arrangement of the bristle material stocks of the brush member.

DESCRIPTION OF THE EMBODIMENTS

The following is a description of the embodiments according to the present application, with reference to the drawings.

Figure 1:
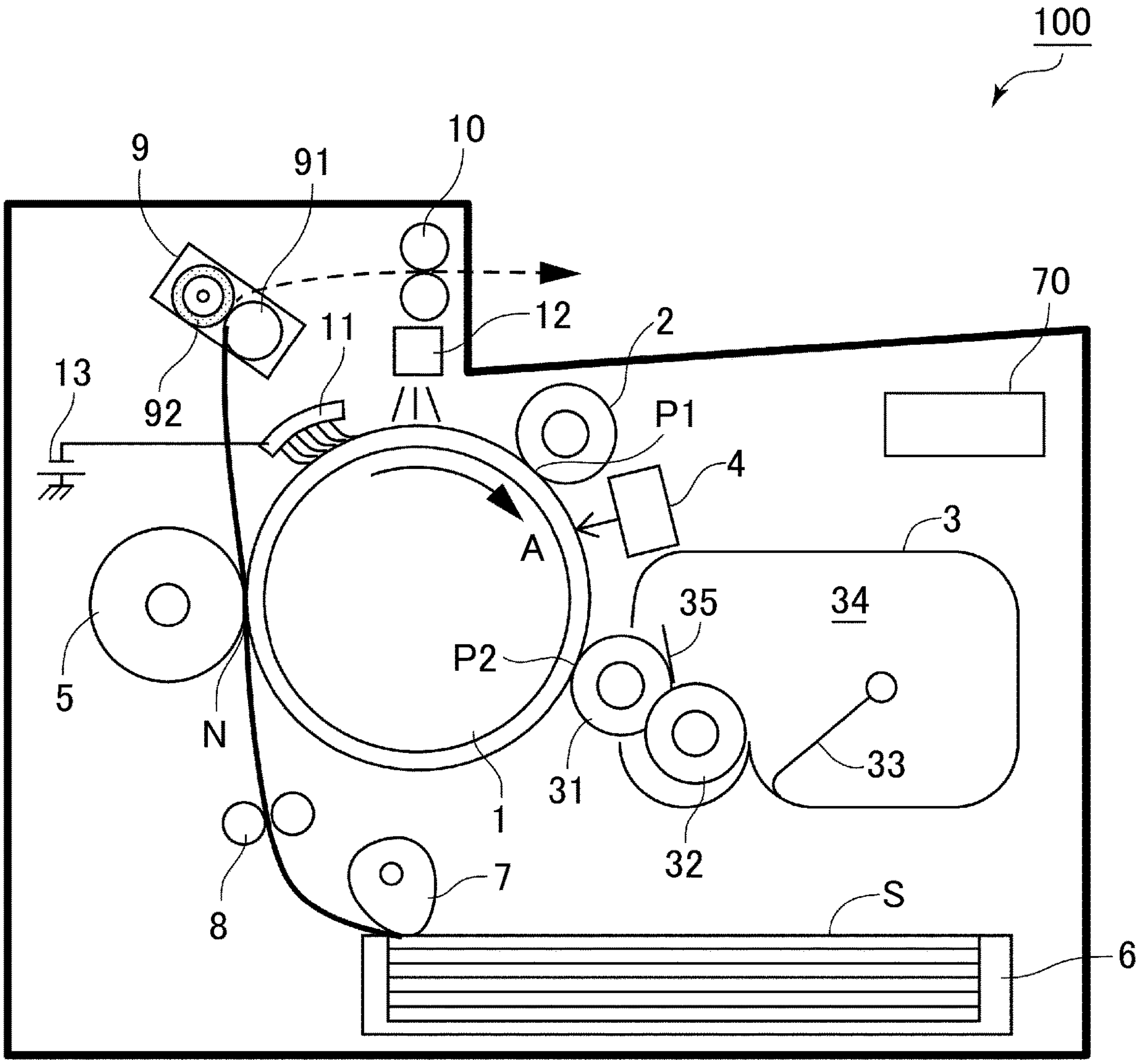
FIG. 1 is a schematic drawing of the image forming apparatus according to embodiment 1 of the present application.

FIG. 1 is a schematic configuration example of an image forming apparatus 100 according to one of the embodiments of the present application (Embodiment 1). The image forming apparatus 100 in the present embodiment is a monochrome printer.

The image forming apparatus 100 has a cylindrical photosensitive member as an image bearing member, i.e., a photosensitive drum 1. Surrounding the photosensitive drum 1 are a charging roller 2 as a charging means and a developing device 3 as a developing means. Between the charging roller 2 and developing roller 3 in the Figure, there is an exposure device 4 as an exposure means. In addition, a transfer roller 5 as a transfer means is pressed against the photosensitive drum 1.

The photosensitive drum 1 in the present embodiment is a negatively charged organic photosensitive member. The photosensitive drum 1 has a photosensitive layer on an aluminum drum-shaped substrate. The photosensitive drum 1 is rotatable around an axis of the drum and is driven by a drive unit (not shown) in the direction of arrow A (clockwise direction in the Figure) at a predetermined process speed. In the present embodiment, the process speed corresponds to the circumferential speed (surface moving speed) of the photosensitive drum 1.

The charging roller 2 contacts the photosensitive drum 1 with a predetermined pressure to form the charging portion P1. During image formation, the charging roller 2 is subjected to a predetermined charging voltage by the charging high-voltage power source (not shown) as the charging voltage supply means, and the surface of the photosensitive drum 1 is uniformly charged to a predetermined potential. In the present embodiment, the photosensitive drum 1 is charged with negative polarity by charging roller 2, and its charging potential (surface of the photosensitive drum 1 immediately after passing through charging portion P1, dark portion potential) is approximately −700 [V].

The exposure device 4 is a laser scanner device in the present embodiment, which outputs a laser beam corresponding to the image information input from an external device such as a host computer and scans and exposes the surface of the photosensitive drum 1. This exposure forms an electrostatic latent image (electrostatic image) on the surface of the photosensitive drum 1 in accordance with the image information. The potential of the exposed area (light portion potential) in the present embodiment is approximately −100 [V]. The exposure device 4 is not limited to a laser scanner device but may employ, for example, an LED array in which a plurality of LEDs are arranged along the longitudinal direction (axial direction of the cylinder) of the photosensitive drum 1.

In the present embodiment, a contact developing method is used as the developing method. The developing device 3 includes a developing roller 31 as a developer carrier, a toner supply roller 32 as a developer supply means, a developer accommodating chamber 34 that accommodates toner, a stirring member 33 that stirs the toner in the developer accommodating chamber 34, and a developing blade 35. The toner (developer) supplied to the developing roller 31 by the toner supply roller 32 from the developer accommodating chamber 34 is charged to a predetermined polarity as it passes through the developing contact portion with the developing blade 35. In the present embodiment, a toner with a particle size of 7 μm and a normal charging polarity (normal polarity) of negative polarity is used. Although a single-component non-magnetic developer consisting of toner was used as the developer in the present embodiment, a two-component developer containing a non-magnetic toner and a magnetic carrier may also be used as the developer. A two-component non-magnetic contact/non-contact developing method may also be used.

The electrostatic latent image formed on the photosensitive drum 1 is developed as a toner image (developer image) by the toner fed by the developing roller 31 at the opposing portion (developing portion P2) between the developing roller 31 and the photosensitive drum 1. During image formation, a developing voltage of −400 V is applied to the developing roller 31 by a developing high-voltage power source (not shown) as a developing voltage applying means. In the present embodiment, the electrostatic latent image is developed by the inverted development method. In other words, the electrostatic latent image is developed as a toner image by adhering toner charged with the same polarity as that of the photosensitive drum 1 to the light portion of the surface of the photosensitive drum 1 after the charging process, where the electric charge has decreased due to exposure by the exposure device 4.

The transfer roller 5 can suitably be made of an elastic member such as sponge rubber formed of polyurethane rubber, EPDM (ethylene propylene diene rubber), or NBR (nitrile butadiene rubber). The transfer roller 5 is pressed toward the photosensitive drum 1 to form a transfer portion N where the photosensitive drum 1 and the transfer roller 5 are pressed together. The transfer roller 5 is connected to a transfer high-voltage power source (not shown) as a transfer voltage applying means, and a predetermined transfer voltage is applied to the transfer roller 5 at a predetermined timing. For example, a corona discharge type transfer device may be used as a direct transfer method transfer means.

At the timing when the toner image formed on the photosensitive drum 1 reaches the transfer portion N, the transfer material S stacked in a cassette 6 is fed by a feeding unit 7 and fed through a registration roller pair 8 to the transfer portion N. A variety of sheet materials of different sizes and materials can be used as the transfer material S (recording material), such as plain paper and cardboard, plastic film, cloth, sheet materials with surface treatment such as coated paper, and specially shaped sheet materials such as envelopes and index paper. The toner image formed on the photosensitive drum 1 is transferred onto the transfer material S by the transfer roller 5 to which the transfer voltage is applied.

The transfer material S after toner image transfer is fed to a fixing unit 9 as a fixing means. The fixing unit 9 in the present embodiment is a film fixing method equipped with a fixing film 91 with a built-in fixing heater and a thermistor (not shown) to measure its temperature, and a pressure roller 92 to pressurize the fixing film 91. The fixing unit 9 fixes the toner image by heating and pressurizing the transfer material S. After fixing, the transfer material S passes through a discharge roller pair 10 and is discharged out of the machine.

Between the transfer portion N and the charging portion P1, a pre-exposure device 12 is provided as a means of eliminating static from the surface of the photosensitive drum 1. This is to stabilize the discharge in the charging portion P1 by equalizing the uneven charge of the photosensitive drum 1 after it has passed through the transfer portion N and to obtain a uniform charging potential.

The residual transfer toner that remains on the photosensitive drum 1 without being transferred to the transfer material S is removed in the following process. The residual transfer toner is a mixture of toner that is positively charged and toner that is negatively charged but does not have sufficient electric charge. The residual transfer toner is charged again to negative polarity by discharge in the charging portion P1. The residual transfer toner that is charged to negative polarity again in the charging portion P1 reaches the developing device 3 as the photosensitive drum 1 rotates, and is collected. Therefore, the "brush member" in the present embodiment is different from the brush member as a cleaning unit (drum cleaner) intended to remove the residual toner from the photosensitive drum 1.

[Toner]

The toner used in the present embodiment is a non-magnetic spherical toner created by the suspension polymerization method, with an average particle diameter of 7 μm. The toner particle size has some distribution, but more than 90% of the toner is between 4 and 10 μm. From the viewpoint of image accuracy and stability, a toner with an average particle diameter of, for example, 4 to 10 μm can be suitably used, and an average particle diameter of 6 to 8 μm is more suitable.

The following describes the method for measuring the average particle diameter dt (weight average particle diameter) of toner. The average particle diameter dt was measured using the "Coulter Counter Multisizer 3" (registered trademark, Beckman Coulter, Inc.), a precision particle size distribution measuring device based on the pore electrical resistance method equipped with a 100 μm aperture tube, and the accompanying dedicated software for setting measurement conditions and analyzing measurement data using "Beckman Coulter Multisizer 3 Version 3.51" (Beckman Coulter, Inc.) with 25,000 effective measurement channels, and the measurement data was analyzed and calculated.

The electrolytic solution used for the measurement is a special grade sodium chloride dissolved in ion-exchanged water to a concentration of about 1 mass %, for example, "ISOTON II" (Beckman Coulter, Inc.) can be used.

Before measurement and analysis, the dedicated software was set up as follows. In the "Change Standard Measurement Method (SOMME) Screen" of the dedicated software, set the total number of counts in the control mode to 5,000 particles, the number of measurements to one, and the Kd value to the value obtained using "standard particles 10.0 μm" (Beckman Coulter, Inc.). The threshold value and noise level are automatically set by pressing the Threshold/Noise Level measurement button. Also, set the current to 1600 μA, the gain to 2, the electrolyte to ISOTON II, and check the box for flushing the aperture tube after measurement. In the "Pulse to Grain Size Conversion Settings Screen" of the dedicated software, set the bin interval to logarithmic grain size, the grain size bin to 256 grain size bins, and the grain size range to 2 μm to 60 μm.

Specific measurement methods are as follows:

(1) Put about 200 mL of electrolytic solution in a 250 mL round-bottomed glass beaker for Multisizer 3, set the beaker on a sample stand, and agitate the stirrer rod at 24 rpm in a counterclockwise direction. Then, remove dirt and air bubbles in the aperture tube by using the "Flush Aperture" function of the dedicated software.

(2) Place about 30 mL of the above electrolytic solution in a glass 100-mL flat-bottomed beaker. Add about 0.3 mL of a dilution of "Contaminon N" (a 10 mass % aqueous solution of a neutral detergent for cleaning precision measuring instruments at pH 7 consisting of a nonionic surfactant, an anionic surfactant, and an organic builder, manufactured by Wako Pure Chemical Industries) diluted 3 mass times with ion exchange water as a dispersing agent.

(3) Place 3.3 L of ion-exchanged water in the water tank of the Ultrasonic Dispersion System Tetora 150 (manufactured by Nikkakoki Bios), which incorporates two oscillators with an oscillation frequency of 50 kHz and a phase shift of 180 degrees and has an electrical output of 120 W. Add approximately 2 mL of Contaminon N to the water tank.

(4) Set the beaker of (2) above in the beaker fixing hole of the ultrasonic disperser above and activate the ultrasonic disperser. Then, the height position of the beaker is adjusted so that the resonance state of the liquid surface of the electrolytic solution in the beaker is maximized.

(5) With the electrolytic solution in the beaker in (4) above irradiated with ultrasonic waves, add about 10 mg of toner to the above electrolytic solution in small quantities and disperse it. Then, continue the ultrasonic dispersion process for another 60 seconds. For ultrasonic dispersion, the water temperature in the tank should be adjusted to between 10° C. and 40° C.

(6) Drop the electrolytic solution of (5) above in which the toner is dispersed into the round-bottomed beaker of (1) above placed in the sample stand using a pipette so that the measured concentration is about 5%. The measurement is then performed until the number of particles measured reaches 5,000.

(7) Analyze the measurement data using the above-mentioned dedicated software provided with the device, and calculate the weight average particle diameter. The "average diameter" on the Analysis/Volume Statistics (Arithmetic Average) screen is the weight average particle diameter when the dedicated software is set to graph/volume %. This weight average particle diameter corresponds to the average particle diameter dt of the toner in the present embodiment.

[Paper Dust Removal Mechanism]

When transferring toner from the photosensitive drum 1 to the transfer material S in the transfer portion N, foreign matter such as fibers and fillers contained in the transfer material S, i.e., paper dust, may adhere to the photosensitive drum 1. In the present embodiment, a brush member 11 is provided as a paper dust collecting member (foreign matter removing member) to remove paper dust adhering to the photosensitive drum 1. As shown in FIG. 1, the brush member 11 is arranged to contact the photosensitive drum 1 in the rotation direction (arrow A), downstream from the transfer portion N and upstream from the charging portion P1. In other words, the brush member 11 in the present embodiment contacts the image carrier at a position downstream of the transfer portion N and upstream of the developing portion P2 in the rotation direction of the image bearing member. The brush member 11 is supported by a supporting member (not shown) and is positioned in a fixed position with respect to the photosensitive drum 1, and it slides over the surface of the photosensitive drum 1 as the photosensitive drum 1 rotates.

The brush member 11 collects paper dust transferred from the transfer material S onto the photosensitive drum 1 at the transfer portion N and reduces the amount of paper dust that moves to the charging portion P1 and developing device 3 downstream of the brush member 11 in the moving direction of the photosensitive drum 1. If paper dust is not collected by the brush member 11, the paper dust may intervene in the charging portion P1 and interfere with charging. In this case, the potential of the surface of the photosensitive drum 1 after passing through the charging portion P1 becomes lower than the surrounding potential, and the area corresponding to this area on the transfer portion S may be unintentionally developed black. This adverse effect appears, for example, as black spots on a solid white image (all-white image).

Figure 2:
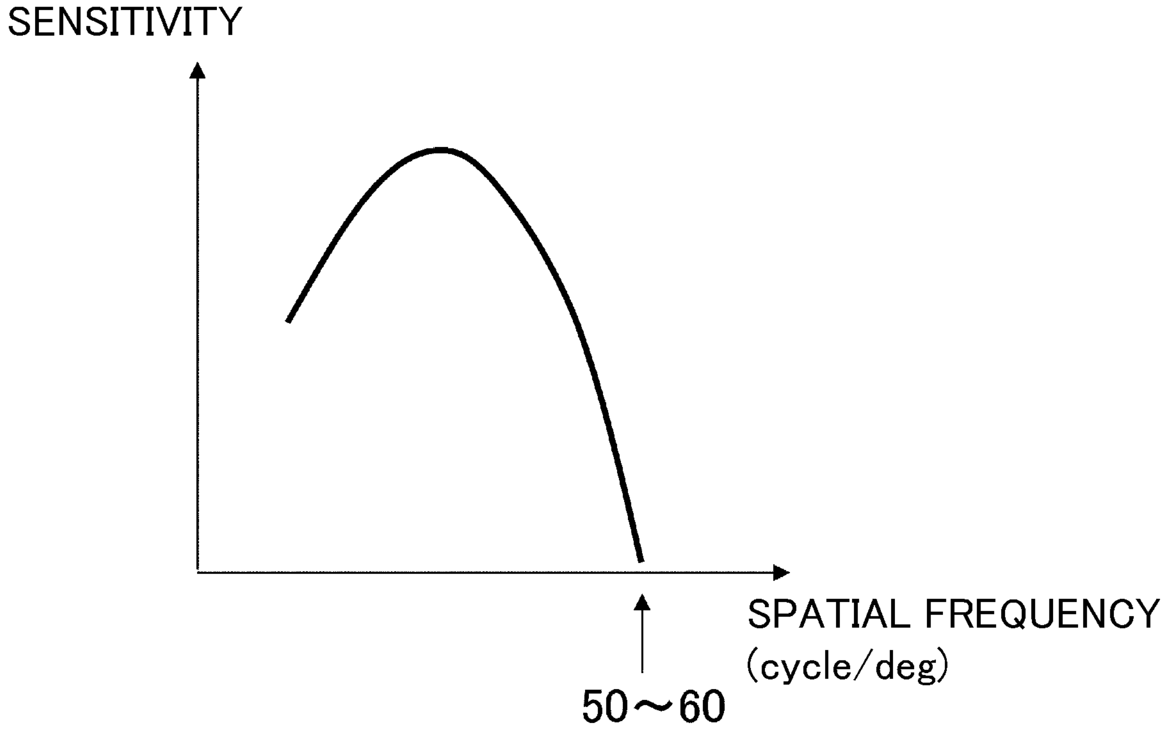
FIG. 2 is a graph showing the characteristics of human vision.

If the size of paper dust not collected by the brush member 11 is small, the level of the above adverse effects is small, but paper dust of larger size tends to make the level of the above adverse effects worse. The size of uncollected paper dust and the size of black spots of image defects are almost the same. As described in "The Institute of Electronics, Information and Communication Engineers, Knowledge Base, Group S3, Part 2, Chapter 5," etc., the spatial frequency that the human eye can perceive is 50-60 cycles/deg. At higher spatial frequencies, it becomes difficult for the human eye to perceive (FIG. 2). FIG. 2 shows the contrast sensitivity characteristics of the human eye to sinusoidal grating patterns at different spatial frequencies. The spatial frequency at which the human eye can perceive the pattern is also called lattice acuity.

Suppose that a typical user views an image formed on a recording material from a distance of 300 mm. In this case, the viewing angle of 1° is 300*2π/360=5.235 (mm), and one cycle at a frequency of 50 cycles/deg is 105 μm. Since the spatial frequency test is conducted based on whether or not the black-white-black-white . . . stripe pattern is visible, the thickness of the black portion of the stripe pattern is equivalent to 52.5 μm, which is half of one cycle. In other words, black areas of 52.5 μm or less are not easily recognized by the average user.

In other words, although it depends on the user's eyesight and the distance from which the user views the image, it can be said that the above black spots are not recognized by the user even when paper dust with a diameter of about 50 μm or less slips through the brush member 11. On the contrary, when paper dust with a diameter of about 50 μm or more slips through the brush member 11, the black spots begin to be slightly visible. When the diameter of the black spots becomes larger than that, e.g., 100 μm or more, they are easily seen as an image defect. In addition, the greater the number of black spots, the worse the image quality impression is given to the user.

On the other hand, it is preferable that residual transfer toner that has reached the brush member 11 be moved downstream in the rotation direction (arrow A) without being accumulated (entangled) in the brush member 11 and remaining attached to the photosensitive drum 1 as much as possible. If toner adheres to and accumulates on the brush member 11, it will remain on the brush member 11 as toner clumps and will be discharged from the brush member 11 onto the photosensitive drum 1 at an unintended timing, which risks causing image defects. Hereafter, discharge of toner clumps from the brush member 11, or image defects caused by such discharge, is also referred to as "toner discharging."

The case in which a toner lump is discharged from the brush member 11 is, for example, when the state of contact of the brush member 11 with the photosensitive drum 1 changes because the photosensitive drum 1 starts rotating again after it has stopped rotating. When the fluctuation of the surface potential of the photosensitive drum 1 when the leading end or trailing end of the transfer material S passes through the transfer portion N is large, the contacting portion of the brush member 11 may change its state of contact with the brush member 11 when the fluctuating surface potential passes through the brush member 11, causing the toner mass to be discharged. If the amount of toner lumps discharged on the photosensitive drum 1 is small, it can be collected by the developing device 3, but if the amount of toner lumps discharged on the photosensitive drum 1 is large, it becomes difficult for the developing device 3 to collect the toner. In such a case, part of the toner clumps that are not collected may be transferred to the transfer portion S in the transfer portion N, resulting in an image defect.

In other words, the brush member 11 should collect paper dust as much as possible and toner as little as possible.

[Configuration of the Brush Member]

Figure 3:
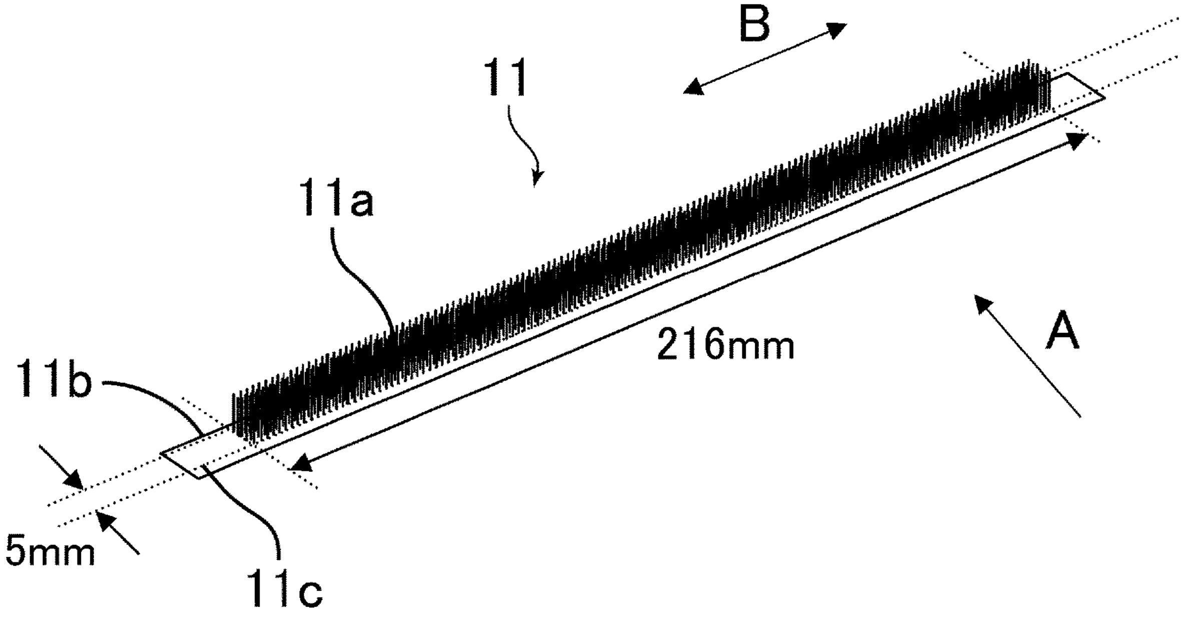
FIG. 3 is a schematic drawing of the brush member according to embodiment 1.

The configuration of the brush member 11 in the present embodiment is described below. FIG. 3 shows an external view of the brush member 11 according to the present embodiment. The length of the brush member 11 in a widthwise direction (rotation direction of the photosensitive drum 1, arrow A) is set at 5 mm. The length of the brush member 11 in a longitudinal direction (rotation axis direction of the photosensitive drum 1, arrow B) is set to 216 mm. The lengths of the brush member 11 in the longitudinal and widthwise directions are not limited to this, and may be changed according to the maximum paper width of the image forming apparatus, for example. The maximum feeding width of the image forming apparatus is the width of the transfer material with the largest width in the rotation direction of the photosensitive drum 1 among the transfer materials that the image forming apparatus can form images (can feed).

The brush member 11 has a thread 11*a* made of conductive 6-nylon as a plurality of bristle material (base material) that rubs the surface of the photosensitive drum 1, a base fabric 11*b* supporting the thread 11*a*, and a sheet metal 11*c* for attaching and fixing the base fabric 11*b*. In addition to nylon, rayon, acrylic, polyester, or other materials may be used for the thread 11*a*. In the present embodiment, conductive thread 11*a* was used, but a thread made of an insulating material may also be used. The brushes may also be made by textile brushes or brushes created by electrostatic implantation method. In the present embodiment, a woven brush was used.

A bias voltage (brush voltage) of −400 V is applied to the sheet metal 11*c* in the present embodiment by a brush power source 13 (FIG. 1) as a means of applying voltage when the photosensitive drum 1 rotates. This brush voltage is of the same polarity as the normal charging polarity of the toner adhering to the photosensitive drum 1, and thus helps to pass the toner on the photosensitive drum 1 without collecting it. The brush voltage should be a value that has the same polarity as the normal charging polarity of the toner with respect to the surface of the photosensitive drum 1 that has passed through the transfer portion N. The brush member 11 may be configured so that no brush voltage is applied to it.

The length (bristle length) of the thread 11*a* of the brush member 11 in the present embodiment is 5 mm, and the brush member 11 is positioned to penetrate (enter) the surface of the photosensitive drum 1 by 1 mm. Here, the 1 mm penetration (entering) of the brush member 11 means that the shortest distance from the base fabric 11*b* to the surface of the photosensitive drum 1, measured in the direction of the protrusion of the thread 11*a* against the base fabric 11*b*, is 1 mm shorter than the length of the thread 11*a*. In other words, it means that the brush member 11 is positioned so that 1 mm from the leading end of the thread 11*a* penetrates inside the virtual cylindrical surface corresponding to the position of the surface of the photosensitive drum 1, assuming that there is no interference with the photosensitive drum 1.

The fineness of the thread 11*a* used in the present embodiment is 6 d, and the density is 180 kF/inch$^2$. The unit of fineness of the brush member 11 is "d (denier)," which is the weight of a 9000 m length of thread, and a larger fineness indicates a larger diameter of the fiber. The diameter of the fibers in the present embodiment was 27 μm based on microscopic observations. The unit of density of the brush member 11 is "kF/inch$^2$," which indicates the number of filaments per square inch. 1 kF/inch$^2$ is a density of 1000 filaments per square inch.

Based on these values, schematic drawings showing how the brush member 11 contacts the photosensitive drum 1 are shown in parts (a) and (b) of FIG. 4. Part (a) of FIG. 4 is a schematic drawing showing a unit area (1 mm$^2$) when the brush member 11 is observed from directly above (leading end of the thread 11*a*). Part (b) of FIG. 4 is a schematic drawing of the brush member 11 viewed from upstream in the rotation direction of the photosensitive drum 1.

In the Figure, dens represents the density of the brush (kF/mm$^2$), D represents the fiber diameter of the thread 11*a* (μm), and I represents the average spacing between fibers in the longitudinal direction (μm). The density of 180 kF/inch$^2$ of the thread 11*a* of the brush member 11 in Embodiment 2 can be converted to dens=279 (F/mm$^2$), since 1 inch=25.4 mm. In the present embodiment, the leading ends of thread 11*a* are isotropically distributed with respect to the width-wise direction (rotation direction of the photosensitive drum 1, arrow A) and the longitudinal direction (rotation axis direction of the photosensitive drum 1, arrow B) of the brush member 11. Therefore, by taking the square root of the density dens, we can estimate how many threads 11*a* are in contact with the photosensitive drum 1 for a width of 1 mm in the longitudinal direction of the photosensitive drum 1. In the present embodiment, √279=16.7 (threads). Since the fiber diameter of the thread 11*a* is 27 assuming that the threads 11*a* are evenly spaced, the gap between the threads 11*a* (average distance between bristle materials, hereafter also called average distance between fibers) is I=(1000−16.7×27)/16.7=33 (μm).

Paper dust larger than the inter-fiber average distance I is physically difficult to slip through the brush member 11. Paper dust of a size smaller than the inter-fiber average distance I can slip through the brush member 11, but if the size of the paper dust is 50 μm or smaller, it is difficult to be seen as black spots as long as the user has the aforementioned normal view due to human visual characteristics as described above. In other words, if the inter-fiber average distance I is 50 μm or less, it is possible to collect paper dust of a size that can be seen by the user. Regarding toner dischargeability, if the inter-fiber average distance I is equal to or greater than the toner particle diameter, the toner can easily pass through the brush member 11. Specifically, since the average particle diameter of toner is 7 μm, if the inter-fiber average distance I is larger than 7 μm, the brush member 11 is likely to pass the toner without collecting it.

[Method of Examination]

The performance of the brush member 11 in the present embodiment was evaluated.

Using CenturyStar paper (product name, manufactured by CENTURY PULP AND PAPER) as the transfer material S, 5,000 sheets are printed, and every 100 sheets, a full white image (solid white image) printed after printing a full black image (solid black image) is acquired. The paper dust collectability is determined based on the maximum number of spotted images that appeared in said all-white images. In the present embodiment, paper dust collectability is judged as X (not acceptable) when the number of visible black spots is greater than 10, Δ (acceptable) when the number is between 3 and 10, and ○ (good) when the number is less than 3.

For toner discharge, the toner discharge property was checked for image defects caused by toner discharge in the solid white image after printing six consecutive sheets, five full-surface halftone images and one solid white image. If no toner discharge defects were observed, the toner discharge property was rated ○ (acceptable), and if obvious toner discharge defects were observed, the toner discharge property was rated X (not acceptable). When the toner discharge property is ○, the image was judged to be ◎ (good) if no toner discharge defects were observed in the solid white image, even after 11 consecutive prints of 10 full halftone images and 1 solid white image.

Table 1 shows the relationship between the configuration of the brush member 11 and the paper dust collection and toner discharge properties studied above.

TABLE 1

| | Brush fineness (d) | Brush density (kF/mm2) | Fiber diameter (μm) | Inter-fiber average distance I (μm) | Paper dust collection | Toner discharge |
|---|---|---|---|---|---|---|
| Embodiment 1 | 6 | 180 | 27 | 33 | ○ | ○ |
| Modified example 1-1 | 4 | 240 | 21 | 31 | ○ | ○ |
| Modified example 1-2 | 4 | 180 | 21 | 39 | ○ | ○ |
| Embodiment 2 | 2 | 180 | 15 | 45 | ○ | ◎ |
| Modified example 2-1 | 2 | 240 | 15 | 37 | ○ | ◎ |
| Comparative example 1 | 6 | 70 | 27 | 69 | X | ○ |
| Comparative example 2 | 4 | 120 | 21 | 52 | Δ | ○ |
| Comparative example 3 | 2 | 120 | 15 | 58 | Δ | ◎ |
| Comparative example 4 | 10 | 70 | 35 | 61 | Δ | X |

As shown in Table 1, it was confirmed that embodiment 1 has excellent performance in both paper dust collection and toner discharge according to configuration of embodiment 1. Table 1 also includes the results for the following embodiments, modified examples, and comparative examples.

As a modified example 1-1, a brush member 11 with a fineness of 4 d and a density of 240 kF/inch$^2$ was prepared and its performance was checked. The fiber diameter was 21 μm and the inter-fiber average distance was 31 μm. The conditions other than the brush member 11 are the same as in Embodiment 1. As in Embodiment 1, it was confirmed that the performance was excellent in both paper dust collection and toner discharge.

As a modified example 1-2, a brush member 11 with a fineness of 4 d and a density of 180 kF/inch$^2$ was prepared and its performance was checked. The fiber diameter was 21 μm and the inter-fiber average distance was 39 The conditions other than the brush member 11 are the same as in Embodiment 1. As in Embodiment 1, it was confirmed that the performance was excellent in both paper dust collection and toner discharge.

In the above Embodiment 1 and its modified examples, the inter-fiber average distance I is sufficiently narrow to collect paper dust of a size that is visible to the user as an image defect, and good results are considered to have been obtained with respect to paper dust collection. In addition, since the inter-fiber average distance I is larger than the toner size (7 μm), good results were also obtained for toner discharge.

In Embodiment 2, a brush member 11 is prepared using a thread 11*a* with a smaller fineness than in Embodiment 1 as the bristle material. The fineness was 2 d and the density was 180 kF/inch$^2$. The fiber diameter was 15 μm and the inter-fiber average distance was 45 μm. Other conditions are the same as in Embodiment 1.

Evaluation of the brush member 11 in the present embodiment showed that it was superior in paper dust collection and even better than in Embodiment 1 in toner discharge.

As a modified example 2-1, a brush member 11 with a fineness of 2 d and a density of 240 kF/inch$^2$ was prepared and its performance was checked. The fiber diameter was 15 μm and the inter-fiber average distance was 37 μm. The conditions other than the brush member 11 are the same as in Embodiment 1. As in Embodiment 2, the paper dust collection performance of this modified example was excellent, and the toner discharge performance was even better than that of Embodiment 1.

Embodiment 2 and its modified example described above use a thread 11*a* with a smaller fineness than in Embodiment 1. This is thought to make it possible to further enhance toner discharge than in embodiment 1. FIG. 5, parts (a) to (c), shows the relationship between the thread 11*a* and the size of the toner t. The surface of the photosensitive drum 1 is moving in the direction of arrow A from bottom to top in the Figure. FIG. 5, parts (a) to (c), shows the behavior of toner t when the fiber diameter D of the thread 11*a* of the brush member 11 is varied at three levels.

The dt in the Figure indicates the toner diameter (μm).

As shown in part (a) of FIG. 5, when D<3 dt, even if the toner t strikes the thread 11*a* of the brush member 11, the curvature of the thread 11*a* is large (the radius of curvature of the surface of the thread 11*a* is small) from the perspective of the toner t, and the toner t is unstable on the thread 11*a*. Therefore, the toner t moves to the side of the thread 11*a* (the side of the thread 11*a* in the longitudinal direction of the brush member 11) due to the adhesive force with the photosensitive drum 1 or the frictional force received from the photosensitive drum 1. The thread 11*a* cannot adsorb and hold the toner that has moved aside, and as a result, the toner t is not collected by the thread 11*a* and easily slips downstream of the brush member 11*a*.

When D=3 dt as shown in part (b) of FIG. 5, the curvature of the thread 11*a* becomes smaller (the radius of curvature of the surface of the thread 11*a* increases) and the surface of the photosensitive drum 1 facing in the direction of feeding increases, making it easier for the thread 11*a* to retain the toner t. As shown in part (c) of FIG. 5, when D>>3 dt, the thread 11*a* can easily retain more toner, and the retained toner will deposit more toner.

As described above, Embodiment 2 and modified example 2-1, in which the fiber diameter D is 15 μm and smaller than three times the average toner particle diameter of 7 are considered to have particularly excellent toner discharge properties.

As a comparative example 1, a brush member 11 with a fineness of 6 d and a density of 70 kF/inch$^2$ was prepared and its performance was checked. The fiber diameter was 27 μm and the inter-fiber average distance was 69 μm. The conditions other than the brush member 11 are the same as in embodiment 1. In the present comparative example, the inter-fiber average distance was larger than the 50 μm diameter of paper dust visible as image defects, resulting in significantly inferior paper dust collection compared to the above embodiments and modified examples.

As a comparative example 2, a brush member 11 with a fineness of 4 d and a density of 120 kF/inch$^2$ was prepared and its performance was checked. The fiber diameter was 21 μm and the inter-fiber average distance was 52 μm. The conditions other than the brush member 11 are the same as in Embodiment 1. In this comparative example, the inter-fiber average distance was slightly larger than the paper dust diameter of 50 μm, which is visible as an image defect, resulting in slightly inferior paper dust collection.

As a comparative example 3, a brush member 11 with a fineness of 2 d and a density of 120 kF/inch$^2$ was prepared and its performance was checked. The fiber diameter was 15 μm and the inter-fiber average distance was 58 μm. The conditions other than the brush member 11 are the same as in Embodiment 1. In this comparative example, the inter-fiber average distance was larger than the paper dust diameter of 50 μm, which is visible as an image defect, resulting in slightly inferior paper dust collection. However, because of the small fiber diameter, toner discharge was very good for the reasons explained using FIG. 5, parts (a) to (c).

As a comparative example 3, a brush member 11 with a fineness of 10 d and a density of 70 kF/inch$^2$ was prepared and its performance was checked. The fiber diameter was 35 μm and the inter-fiber average distance was 61 μm. The conditions other than the brush member 11 are the same as in Embodiment 1. In this comparative example, the inter-fiber average distance I was larger than the paper dust diameter of 50 μm, which is visible as an image defect, resulting in inferior paper dust collection. In addition, since the fiber diameter D is 5 times larger than the average particle diameter dt of the toner, which is 3 times larger than the average particle diameter dt of the toner, the condition shown in part (c) of FIG. 5 is D>>3 dt, resulting in poor toner discharge. Therefore, a fiber diameter D less than 5 times the average particle diameter dt of the toner (D<5 dt) is preferable to suppress toner discharge.

The above results show that the embodiments and modified examples in which the inter-fiber average distance is larger than the average particle diameter dt of toner (7 μm) and less than the length corresponding to human grid vision (50 μm) prevent image defects due to paper dust and also show excellent results against toner discharge. In other words, according to the embodiment of the present application, toner accumulation can be reduced while ensuring the paper dust collection performance of the collection member.

Furthermore, Embodiment 2 and modified example 2, where the fiber diameter D is less than three times the average particle diameter dt of the toner (D<3 dt), showed particularly excellent toner discharge.

Although no significant difference was observed in the verification of Table 1, it is considered that the smaller the size of paper dust passing through the brush member 11, the less likely the image defects caused by paper dust will become apparent, even if the user's eyesight or observation distance fluctuates. Therefore, an inter-fiber average distance of, for example, 45 μm or less is more preferable, and 40 μm or less is even more preferable.

Although toner can pass through the brush member 11 if the inter-fiber average distance of the brush member 11 is larger than the average particle diameter of the toner, it is considered that toner will pass more easily if the inter-fiber average distance is sufficiently larger than the average particle diameter than if it is close to the average particle diameter. From the viewpoint of more reliably reducing toner discharge, it is suitable, for example, if the inter-fiber average distance of the brush member 11 is at least twice the average toner particle diameter (7 μm), or more preferably, at least four times the average toner particle diameter.

We have discussed the preferred value of the inter-fiber average distance I in the direction perpendicular to the moving direction (arrow A) of the photosensitive drum surface (longitudinal direction of the brush member 11), and the following explains the spacing between the bristles of the brush member 11 in the moving direction of the photosensitive drum surface. The distance between the bristle materials in the moving direction of the photosensitive drum surface (inter-fiber average distance) should be wider than the inter-fiber average distance I in the longitudinal direction. This allows toner reaching the brush member 11 to flow more smoothly downstream in the moving direction on the surface of the photosensitive drum 1, making toner discharge less likely to occur. Since the inter-fiber average distance I, which is the fiber spacing in the longitudinal direction of the brush member 11, is important for paper dust collectability, paper dust collectability is maintained even if the fiber spacing in the moving direction of the photosensitive drum surface is somewhat wider.

Specifically, in the case of the textile brush used in Embodiment 1, as shown in FIG. 6, the arrangement of the strains of the thread 11*a* of the brush member 11 (each point on the left of FIG. 6) should be relatively sparse with respect to the moving direction of the surface of the photosensitive drum (arrow A) and relatively dense with respect to the longitudinal direction of the brush member 11 (arrow B). The position of the bristle material strains is the position of the starting point of the bundle of threads 11*a* that is supported at the same point on the base fabric 11*b*.

If the distance between the stocks in the moving direction of the photosensitive drum surface is PA and the distance between the stocks in the longitudinal direction of the brush member 11 (arrow B) is PB, then PA>PB is sufficient. In the Figure, it is assumed that the threads 11*a* in each strain extend almost equally (i.e., isotropically) in all directions viewed from the normal direction of the base fabric 11*b*, and that the number of threads 11*a* in each strain is also almost equal.

In the embodiments described above, assuming, for example, an office or home printer user as a general user, the inter-fiber average distance of the brush member 11 is described as 50 μm or less, which is equivalent to the grid vision when viewing an image with the naked eye from a distance of 30 cm. Not limited to this, depending on the application of the image forming apparatus, there are cases in which it is normal for the printed image to be observed from a position farther than 30 cm (or closer than 30 cm). Therefore, the preferred value of the inter-fiber average distance of the brush member 11 can vary depending on the average observation distance of the image that the image forming apparatus primarily outputs.

As an example, in the case of a large format printer that mainly prints posters, etc., the average observation distance is considered to be farther than 30 cm. In this case, if the user were to view the image formed on the recording material from a distance of 1 m, the length corresponding to the spatial frequency that can be recognized by the user (diameter of the visible black spots) would be about 175 μm, so the inter-fiber average distance of the brush member 11 would be 175 μm or less. Conversely, in the case of an image forming apparatus that mainly outputs images that are usually observed using a magnifying glass, for example, the length corresponding to the spatial frequency that can be recognized by the user (diameter of a visible black spot) is shorter than 52.5 μm. In this case, it is conceivable to set the inter-fiber average distance of the brush member 11 to a predetermined value of less than 50 μm.

The above embodiments have been described using a monochrome printer as an example, but the present technology can also be applied to a direct-transfer color printer. A direct-transfer color printer is, for example, an image forming apparatus in which multiple process units, each equipped with an image bearing member (photosensitive drum), are arranged along the feeding path of the recording material. In this case, a colored image is formed on the recording material by transferring toner images of each color formed in each process unit to the recording material in turn.

In the embodiments described above, a direct-transfer method configuration in which the toner image is transferred directly from the photosensitive drum 1 (image bearing member) to the transfer material (recording material) as the transferee is described, but this technology may also be applied to an intermediate-transfer method image forming apparatus. In the case of the intermediate-transfer method, the transfer member refers to, for example, a transfer roller (primary transfer roller) that performs primary transfer of the toner image from the photosensitive drum 1 as the image bearing member to the intermediate transfer material as the transferee. As an intermediate transfer member, an endless belt member stretched over a plurality of rollers can be used. The toner image that has been primarily transferred to the intermediate transfer member is secondarily transferred from the intermediate transfer member to the sheet (recording material) by means of a secondary transfer means such as a secondary transfer roller that forms a secondary transfer nip portion between the intermediate transfer member and the secondary transfer roller. In such a configuration of the intermediate-transfer method, the same effect as in the above embodiment can be obtained by replacing the transfer roller in the above embodiment with a primary transfer roller.

According to the present invention, toner accumulation can be reduced while ensuring the paper dust collection performance of the brush member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-002364, filed Jan. 11, 2022, which is hereby incorporated by reference herein in its entirety.

What is claimed is:

1. An image forming apparatus comprising:

a rotatable image bearing member;

a developing member configured to develop an electrostatic latent image formed on the image bearing member using a developer at a developing portion;

a transfer member configured to transfer a developer image developed by the developing member from the image bearing member to a transferred member at a transfer portion; and a brush contacting the image bearing member at a position of downstream of the transfer portion and upstream of the developing portion with respect to a rotational direction of the image bearing member, wherein the developer remaining on the surface of the image bearing member is collected at the developing portion, and wherein an average distance between bristle materials of the brush with respect to a rotational axis direction of the image bearing member is larger than an average particle diameter of the developer, and is equal to or less than a length corresponding to a spatial frequency of 50 cycles/degree.

2. An image forming apparatus according to claim 1, wherein the average distance is equal to or less than 50 μm.

3. An image forming apparatus according to claim 1, wherein the average distance is equal to or less than 45 μm.

4. An image forming apparatus according to claim 1, wherein when a fiber diameter of the bristle materials of the brush is defined as D (μm) and the average particle diameter of the developer is defined as d (μm), it is satisfied to be $D<5d$.

5. An image forming apparatus according to claim 1, wherein when a fiber diameter of the bristle materials of the brush is defined as D (μm) and the average particle diameter of the developer is defined as d (μm), it is satisfied to be $D<3d$.

6. An image forming apparatus according to claim 1, wherein when free ends of the bristle materials of the brush are isotropically distributed with respect to the rotational axis direction of the image bearing member and the rotational direction of the image bearing member, and wherein the average distance is a square root of a density of the bristle materials.

7. An image forming apparatus according to claim 1, wherein an average distance of the bristle materials of the brush between each other along one plane with respect to the rotational direction of the image bearing member is larger than the average distance of the bristle materials of the brush between each other along another plane with respect to the rotational axis direction of the image bearing member.

8. An image forming apparatus according to claim 1, further comprising a voltage applying unit configured to apply a voltage, having the same polarity as a normal charging polarity of the developer to a surface potential of the image bearing member passing through the transfer portion, to the brush.

9. An image forming apparatus according to claim 1, wherein the transferred material is a recording material.

10. An image forming apparatus according to claim 1, wherein the transferred member is an intermediary transfer member, and further comprising a secondary transfer member configured to transfer the toner image transferred on the intermediary transfer member to a recording material.

11. An image forming apparatus according to claim 1, further comprising a charging member configured to charge a surface of the image bearing member, wherein the charging member charges the surface of the image bearing member by contacting the surface of the image bearing member.

12. An image forming apparatus according to claim 1, wherein a density of the bristle materials of the brush is more than 120 $kF/inch^2$.

13. An image forming apparatus according to claim 1, wherein a density of the bristle materials of the brush is equal to or more than 180 $kF/inch^2$.

14. An image forming apparatus comprising:

a rotatable image bearing member;

a developing member configured to develop an electrostatic latent image formed on the image bearing member using a developer at a developing portion;

a transfer member configured to transfer a developer image developed by the developing member from the image bearing member to a transferred member at a transfer portion; and a brush contacting the image bearing member at a position of downstream of the transfer portion and upstream of the developing portion with respect to a rotational direction of the image bearing member, wherein the developer remaining on the surface of the image bearing member is collected in the developing portion, and wherein an average distance between bristle materials of the brush with respect to a rotational axis direction of the image bearing member is larger than an average particle diameter of the developer, and is equal to or less than 50 μm.

* * * * *